(12) United States Patent
Hershey et al.

(10) Patent No.: US 7,460,160 B2
(45) Date of Patent: Dec. 2, 2008

(54) MULTISPECTRAL DIGITAL CAMERA EMPLOYING BOTH VISIBLE LIGHT AND NON-VISIBLE LIGHT SENSING ON A SINGLE IMAGE SENSOR

(75) Inventors: John Hershey, Seattle, WA (US); Zhengyou Zhang, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 673 days.

(21) Appl. No.: 10/949,085

(22) Filed: Sep. 24, 2004

(65) Prior Publication Data

US 2006/0066738 A1    Mar. 30, 2006

(51) Int. Cl.
*H04N 3/14* (2006.01)
*H04N 5/335* (2006.01)

(52) U.S. Cl. .................................... 348/273
(58) Field of Classification Search .............. 348/273
See application file for complete search history.

(56) References Cited

U.S. PATENT DOCUMENTS

| | | | | |
|---|---|---|---|---|
| 4,945,409 A | * | 7/1990 | Nakamura | 348/70 |
| 5,745,173 A | * | 4/1998 | Edwards et al. | 348/208.4 |
| 6,150,930 A | * | 11/2000 | Cooper | 340/435 |
| 6,759,646 B1 | * | 7/2004 | Acharya et al. | 250/226 |
| 2004/0186351 A1 | * | 9/2004 | Imaizumi et al. | 600/160 |

* cited by examiner

*Primary Examiner*—James M Hannett
(74) *Attorney, Agent, or Firm*—Lyon & Harr, LLP; Richard T. Lyon

(57) ABSTRACT

A digital camera having a single image sensor made up of an array of filtered photosites used to capture non-visible light wavelengths in addition to the standard red/green/blue (RGB) or other visible light intensity values is presented. Essentially, this is accomplished using a separate filter disposed over each photosite that exhibits a light transmission function with regard to wavelength which passes only a prescribed range of wavelengths—some passing light in the visible light spectrum and others in the non-visible light spectrum. The photosites passing non-visible light wavelengths can be configured to pass light in the infrared (IR) light spectrum, which can be limited to just the near infrared (NIR) spectrum if desired, or alternately light in the ultra-violet (UV) light spectrum.

8 Claims, 1 Drawing Sheet

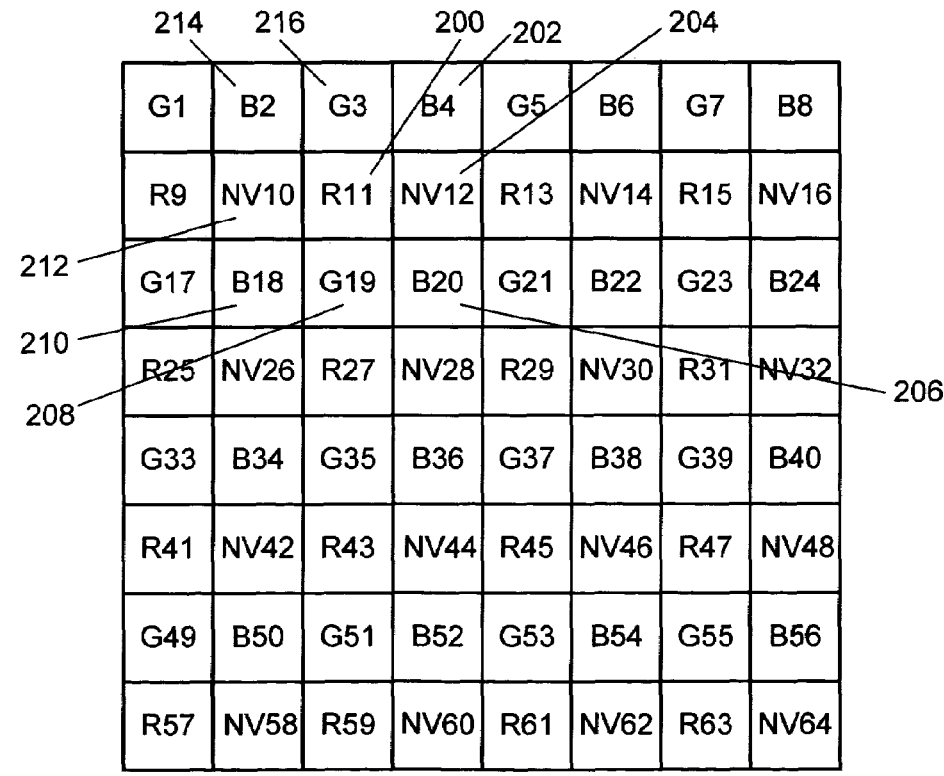

| G1  | B2  | G3  | B4  | G5  | B6  | G7  | B8  |
|-----|-----|-----|-----|-----|-----|-----|-----|
| R9  | G10 | R11 | G12 | R13 | G14 | R15 | G16 |
| G17 | B18 | G19 | B20 | G21 | B22 | G23 | B24 |
| R25 | G26 | R27 | G28 | R29 | G30 | R31 | G32 |
| G33 | B34 | G35 | B36 | G37 | B38 | G39 | B40 |
| R41 | G42 | R43 | G44 | R45 | G46 | R47 | G48 |
| G49 | B50 | G51 | B52 | G53 | B54 | G55 | B56 |
| R57 | G58 | R59 | G60 | R61 | G62 | R63 | G64 |

FIG. 1

| G1  | B2   | G3  | B4   | G5  | B6   | G7  | B8   |
|-----|------|-----|------|-----|------|-----|------|
| R9  | NV10 | R11 | NV12 | R13 | NV14 | R15 | NV16 |
| G17 | B18  | G19 | B20  | G21 | B22  | G23 | B24  |
| R25 | NV26 | R27 | NV28 | R29 | NV30 | R31 | NV32 |
| G33 | B34  | G35 | B36  | G37 | B38  | G39 | B40  |
| R41 | NV42 | R43 | NV44 | R45 | NV46 | R47 | NV48 |
| G49 | B50  | G51 | B52  | G53 | B54  | G55 | B56  |
| R57 | NV58 | R59 | NV60 | R61 | NV62 | R63 | NV64 |

FIG. 2

MULTISPECTRAL DIGITAL CAMERA EMPLOYING BOTH VISIBLE LIGHT AND NON-VISIBLE LIGHT SENSING ON A SINGLE IMAGE SENSOR

BACKGROUND

1. Technical Field

The invention is related to digital cameras employing a single image sensor, and more particularly to a digital camera having an image sensor made up of an array of filtered photosites used to capture non-visible light wavelengths in addition to the standard red/green/blue (RGB) or other visible light intensity values.

2. Background Art

Digital cameras, including digital video cameras, are in common use. While these cameras have many systems and subsystem, at a basic level, they typically include a camera body to which an optical lens assembly is attached. The lens assembly typically includes one or more lenses and a variable aperture. Behind the lens in the camera body is a shutter mechanism that interrupts the light entering the lens assembly and prevents it from reaching an image sensor (also mounted in the camera body) until the shutter is opened. There is also a viewfinding apparatus of some type that lets the user view the portion of the surrounding scene that is being captured. Various other sensors and mechanisms, and an image storage device are included as well. For example, the camera can include a white balance sensor that detects the color temperature of the subject image, and a focus detector module that detects the convergence of the focal point and adjusts the focal length of the lens assembly so as to focus the light on the image sensor when the shutter is opened. There are also sensing devices that detect the amount of light being received. This information is used by the camera to set the size of the aperture and the speed at which the shutter opens and closes so as to let just enough light in the camera to produce an optimally exposed image. There are also mechanisms in the camera body for directing the light entering the lens to the various sensors at the appropriate times.

When the shutter is opened to capture an image, the light entering the lens becomes incident on the image sensor which in general generates an electric signal corresponding to the amount of light received before the shutter is closed. The image sensor also typically performs signal processing tasks such white-balance correction, and outputs the processed image signals in digital form to the camera storage module.

The present invention involves advantageous modifications to the aforementioned image sensor. As such a more detailed description of the image sensor is warranted. There are generally two types of image sensors used in digital cameras. The first is a charge coupled device (CCD) image sensor, and the other is a complementary metal oxide semiconductor (CMOS) image sensor. In general, these image sensors include thousands, or even millions, of light-receiving photosites. The energy of the light incident to each photosite is converted into a signal charge which is output from the sensor.

This charge, however, only represents the intensity of the light that was incident on a particular photosite for the time the shutter is open. It does not produce color images. To produce color images, in general, most image sensors employ a filtering scheme to look at the incoming light in its three primary colors (e.g., typically red, green and blue (RGB)). Once all three primary colors have been measured, they can be combined to create the full spectrum color image. There are several ways to capture the intensity of each of the primary colors of the light. However, the method applicable to the present invention generally involves using a single image sensor having a 2-D array of photosites each of which is dedicated to a particular primary color and interpolating the color for each pixel of the image using the intensity of the colors detected at the photosites in a neighborhood around the pixel location. This method has the advantages of requiring just one sensor and measuring all the color information at the same time. As a result, the digital camera can be made smaller and less expensive than, for example, multiple image sensor cameras. To dedicate each photosite to a particular primary color, appropriate filters are placed between the photosite and the incoming light, which only let light of the desired wavelengths through to the photosite. Typically, these filters are integrated into the image sensor itself.

The most common pattern for the color filters is the Bayer filter pattern. This pattern alternates a row of blue and green filters with a row of red and green filters, as represented in FIG. 1. This results in there being twice as many green filters as there are red or blue filters. This is because humans are more sensitive to green. The raw output of a Bayer filtered image sensor is an array of red, green and blue intensity values. These raw outputs are subjected to a demosaicing algorithm that converts the separate color values into an equal-sized array of true colors. Typically, this is accomplished by averaging the intensity values for each missing primary color from the closest surrounding photosites.

While existing digital cameras having a single image sensor are well suited for general photography and video recording purposes, some applications would be enhanced if other non-visible light wavelengths were captured in addition to the standard RGB intensity values. For example, machine vision applications, such as face and eye tracking, can be improved by the inclusion of sensors that respond to near-infrared (NIR) wavelengths of light in addition to the traditional RGB sensors. The NIR sensitivity is useful for locating and identifying objects of interest, in a manner similar to visible color. For instance, the human face in the NIR wavelength range under ambient light conditions exhibits an exaggerated brightness of the skin, a lack of lip coloration, and a darkness of the eyes. In combination with visual-spectrum color images these characteristics can be helpful in segmenting and locating the lips and eyes. It is also noted that NIR is less susceptible to variations in the ambient light conditions. In addition, NIR wavelengths provide an opportunity to use invisible light sources in an active vision system. For instance, infrared light is readily reflected from the pupils of the eyes resulting in a distinctive pattern of a bright pupil on a dark iris. This can make it possible to more reliably detect eye locations.

Images having both NIR and visible RGB channels may also be useful in processing color images to produce a more pleasing photographic effect. For instance NIR intensity images of natural scenes exhibit a dark sky and bright foliage. The NIR signal may be used to modulate or enhance the RGB signals to produce a desired effect, such as brightening the foliage without brightening the sky.

SUMMARY

The present invention is directed toward a digital camera having a single image sensor made up of an array of filtered photosites used to capture non-visible light wavelengths in addition to the standard red/green/blue (RGB) or other visible light intensity values. The addition of photosites sensitive to non-visible (NV) light wavelengths expands the potential uses of the digital camera as described previously. Essentially this is accomplished using a separate filter disposed over each photosite that exhibits a light transmission function with regard to wavelength which passes only a prescribed range of wavelengths—some passing light in the visible light spectrum and others in the non-visible light spectrum.

The photosites passing NV light wavelengths can be configured to pass light in the infrared (IR) light spectrum, which can be limited to just the near infrared (NIR) spectrum if desired. The NIR spectrum has various uses in machine vision applications including face and eye tracking, as described previously. Alternately, the photosites passing NV light wavelengths can be configured to pass light in the ultra-violet (UV) light spectrum.

In regard to the photosites passing light in the visible spectrum, these sites can additionally include a filter disposed over the photosite that blocks light in the IR spectrum. This is done as IR light can hinder the measurement of the visible light portion of the incident light. In cases where the visible light photosites are RGB photosites, the array can be formed in alternating rows of G and B photosites and R and NV photosites, or any other pair combinations of the four wavelength ranges. This results in a pattern where any square block of photosites containing four photosites includes one photosite passing light only in the red light spectrum, one passing light only in the green light spectrum, one passing light only in the blue light spectrum, and one passing light only in the non-visible light spectrum.

The image sensor also includes a processor having a demosaicing module for computing separate visible light and non-visible light intensity values for each photosite based on an intensity reading captured at the photosite and intensities captured at neighboring photosites. In one embodiment of the demosaicing module employing a linear computation technique, the intensity value captured at a photosite is established as the intensity value for the wavelengths of light passed by its associated filter, and the intensity value for each of the remaining wavelength ranges are computed as the average of the intensity values captured for that wavelength range in photosites immediately adjacent the photosite under consideration in the array.

In addition to the just described benefits, other advantages of the present invention will become apparent from the detailed description which follows hereinafter when taken in conjunction with the drawing figures which accompany it.

DESCRIPTION OF THE DRAWINGS

The specific features, aspects, and advantages of the present invention will become better understood with regard to the following description, appended claims, and accompanying drawings where:

FIG. 1 is a diagram showing the arrangement of RGB color filters according to a conventional Bayer array.

FIG. 2 is a diagram showing the arrangement of RGB color filters and NV light filters according to one embodiment of the present invention.

DETAILED DESCRIPTION OF THE PREFERRED EMBODIMENTS

In the following description of the preferred embodiments of the present invention, reference is made to the accompanying drawings which form a part hereof, and in which is shown by way of illustration specific embodiments in which the invention may be practiced. It is understood that other embodiments may be utilized and structural changes may be made without departing from the scope of the present invention.

The present invention involves configuring a digital camera having a single image sensor made up of an array of filtered photosites to capture non-visible light wavelengths in addition to the standard RGB intensity values. In essence, this is accomplished by replacing the redundant green-filtered photosites of a traditional image sensor with photosites that are exclusively sensitive to the non-visible light wavelength range it is desired to add to the digital cameras capturing capabilities. This replacement concept is illustrated in FIG. 2. As can be seen, in addition to the normal RGB photosites, there are now photosites filtered to measure non-visible (NV) light. By comparing the array of FIG. 2 with that of FIG. 1, it is evident that the NV photosites occupy locations that were once the redundant green-filtered sites. It is noted that even though the extra green color channel is eliminated in the foregoing change to the typical configuration of a digital camera's image sensor, this results in only a relatively minor loss of visible quality, and this is only in regards to a perception of color by the human eye. For machine vision applications, the loss of the redundant green channel is substantially irrelevant.

The types of non-visible photosites that can be added to the image sensor include near infrared (NIR) in the wavelength range between about 700 to about 1550 nanometers. As described previously, capturing a NIR channel is useful in machine vision applications, such as face and eye tracking. Other useful NV wavelength ranges would include the infrared (IR) region beyond NIR in a range extending between about 1550 nanometer to about 1 millimeter (or any sub-range thereof). Still further, NV photosites in the ultraviolet range (or any sub-range thereof) extending between about 400 to about 4 nanometers could be added to the image sensor.

While replacing each of the redundant green channel photosites with the same type of NV sensitive photosite is advantageous as it allows variations of current demosaicing algorithms to be used to establish that type of NV intensity value for each pixel of the image, the invention is not intended to be limited to this embodiment. Rather two or more different types of NV photosites could be added, either uniformly over the entire array or concentrated in specific regions, depending on what application the NV sensitive sites are being added to facilitate.

While configuring an image sensor in a digital camera to include NV photosites in the IR and UV ranges identified previously can be advantageous in many applications, it is also desirable to use existing digital camera CCD and CMOS image sensor technology so as to minimize the cost of the new configurations and to retain the visible light sensitivity of the sensor. However, current CCD and CMOS image sensors are only sensitive in a wavelength range of between about 350 to about 1100 nanometers. This includes part of the NIR wavelength range, and as well a small part of the UV wavelength range. Thus, if cost is a factor, the NV photosites would be limited to sensing light in foregoing partial NIR and UV ranges.

In addition, certain other modifications need to be made to existing digital camera image sensors to accommodate the NV photosites and the signal processing associated therewith. For example, existing digital camera technology includes incorporating an infrared blocking filter that filters the light reaching the entire active image sensor surface. This is done because infrared light adversely effects the measurement of the visible light by the R, G or B photosites. If the NV photosites are to measure light in the IR range (including NIR), then the infrared-blocking filter needs to be eliminated over the NV sites. One way to accomplish this is eliminate the infrared-blocking filter completely, and instead incorporate individual infrared-blocking filters over each of the R, G or B photosites. The NV photosites would then be filtered using conventional methods to pass the IR or NIR portion of the light, but block visible light.

The signal processing changes are straightforward and entail modifying the demosaicing algorithm employed to compute the NV intensity value for each pixel in a manner similar to the way the R and B intensity values are computed. In addition, the G intensity values would be computed like the R and B intensity values, rather than also including the measurements from the eliminated redundant green photosites. By way of an example, consider a demosaicing algorithm that uses linear interpolation of the measured intensities of surrounding photosites to compute the missing color or NV values. Referring to FIG. 2, suppose the photosite R11 (200) corresponds to a pixel for which the RGB and NV intensity values are to be established. The R intensity value is derived directly from the measurement of the red light at the photosite 200. This leaves the G, B and NV intensity values to calculate. This is done by averaging the like intensity values measured at the eight photosites 202, 204, 206, 208, 210, 212, 214, 216 surrounding the photosite 200 under consideration. Thus, the missing NV intensity value can be obtained as: NV11=(NV10+NV12)/2. Similarly, the G intensity value can be obtained as: G11=(G3+G19)/2. And finally, the B intensity value can be established as: B11=(B2+B4+B18+B20)/4. The same process would be used to establish the R, G, B and NV intensity values at all the other photosites.

Wherefore, what is claimed is:

1. A digital camera having an image sensor, said image sensor comprising:
   an 2-D array of photosites forming columns and rows of photosites;
   a separate filter disposed over each photosite which exhibits a light transmission function with regard to wavelength that passes only a prescribed range of wavelengths, wherein for any square block of photosites in the array containing four photosites, one comprises a filter passing light only in a red light spectrum, one comprises a filter passing light only in a green light spectrum, one comprises a filter passing light only in a blue light spectrum, and one comprises a filter passing light only in a non-visible light spectrum; and
   a processor comprising a demosaicing module for computing a separated red, green, blue and non-visible light intensity value for each photosite based on an intensity reading captured at the photosite and intensities captured at neighboring photosites by establishing the intensity value captured at a photosite under consideration linearly as the intensity value for the wavelengths of light passed by its associated filter, and computing an intensity value for each of the remaining wavelength ranges passed by the image sensor filters as the average of the intensity values captured for that wavelength range in photosites immediately adjacent the photosite under consideration in the array.

2. The digital camera of claim 1, wherein the filters are arranged so that the rows of photosites alternate between,
   a pattern of filters alternating between a filter which only passes light in the green light spectrum and a filter which only passes light in the blue light spectrum, and
   a pattern of filters alternating between a filter which only passes light in the red light spectrum and a filter which only passes light in one of the non-visible light spectra.

3. The digital camera of claim 1, wherein the filters are arranged so that the rows of photosites alternate between,
   a pattern of filters alternating between a filter which only passes light in the blue light spectrum and a filter which only passes light in one of the non-visible light spectra, and
   a pattern of filters alternating between a filter which only passes light in the green light spectrum and a filter which only passes light in the red light spectrum.

4. The digital camera of claim 1, wherein the filters are arranged so that the rows of photosites alternate between,
   a pattern of filters alternating between a filter which only passes light in the green light spectrum and a filter which only passes light in one of the non-visible light spectra, and
   a pattern of filters alternating between a filter which only passes light in the red light spectrum and a filter which only passes light in the blue light spectrum.

5. An image sensor for a digital camera, comprising:
   an 2-D array of photosites forming columns and rows of photosites;
   a separate filter disposed over each photosite which exhibits a light transmission function with regard to wavelength that passes only a prescribed range of wavelengths, wherein for any square block of photosites in the array containing four photosites, one comprises a filter passing light only in a red light spectrum, one comprises a filter passing light only in a green light spectrum, one comprises a filter passing light only in a blue light spectrum, and one comprises a filter passing light only in a non-visible light spectrum; and
   a processor comprising a demosaicing module for computing a separated red, green, blue and non-visible light intensity value for each photosite based on an intensity reading captured at the photosite and intensities captured at neighboring photosites by establishing the intensity value captured at a photosite under consideration linearly as the intensity value for the wavelengths of light passed by its associated filter, and computing an intensity value for each of the remaining wavelength ranges passed by the image sensor filters as the average of the intensity values captured for that wavelength range in photosites immediately adjacent the photosite under consideration in the array.

6. The image sensor of claim 5, wherein some of the filters passing light in the non-visible light spectrum pass light in the ultra-violet light spectrum.

7. The image sensor of claim 5, wherein some of the filters passing light in the non-visible light spectrum pass light in the infrared light spectrum.

8. The image sensor of claim 7, wherein some of the filters passing light in the infrared light spectrum pass light in the near infrared light spectrum only.

* * * * *